(12) United States Patent
Begov et al.

(10) Patent No.: US 10,414,227 B2
(45) Date of Patent: Sep. 17, 2019

(54) UNITARY TRUNNION BRACKET

(71) Applicant: ArvinMeritor Technology, LLC, Troy, MI (US)

(72) Inventors: Angel Begov, Shelby Township, MI (US); Jerome M. Kunert, Warren, MI (US); Edward Brown, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 207 days.

(21) Appl. No.: 15/699,402

(22) Filed: Sep. 8, 2017

(65) Prior Publication Data

US 2019/0077209 A1    Mar. 14, 2019

(51) Int. Cl.
| | | |
|---|---|---|
| *B60G 7/00* | (2006.01) |
| *B60G 9/02* | (2006.01) |
| *B62D 63/06* | (2006.01) |
| *B61H 1/00* | (2006.01) |
| *F16D 65/02* | (2006.01) |
| *B60T 1/06* | (2006.01) |
| *B60T 17/00* | (2006.01) |
| *B60T 13/74* | (2006.01) |
| *F16D 51/00* | (2006.01) |
| *F16D 55/00* | (2006.01) |

(52) U.S. Cl.
CPC ............. *B60G 7/008* (2013.01); *B60G 7/001* (2013.01); *B60G 9/02* (2013.01); *B61H 1/00* (2013.01); *B62D 63/068* (2013.01); *F16D 65/02* (2013.01); *B60G 2200/132* (2013.01); *B60G 2204/4306* (2013.01); *B60G 2300/042* (2013.01); *B60G 2300/36* (2013.01); *B60T 1/06* (2013.01); *B60T 13/741* (2013.01); *B60T 17/00* (2013.01); *F16D 2051/003* (2013.01); *F16D 2055/0008* (2013.01)

(58) Field of Classification Search
CPC .. B60G 7/008; B60G 9/02; B60G 2204/4306; B60G 2300/36; B60G 2300/042; B60G 2200/132; F16D 65/02; F16D 2055/0008; F16D 2051/003; B61G 7/001; B62D 63/068; B60T 13/741; B60T 17/00; B60T 1/06
See application file for complete search history.

(56) References Cited

U.S. PATENT DOCUMENTS 3,061,301 A * 10/1962 Jacques ................. B60G 11/40
                                                                  267/52
4,895,350 A *  1/1990 Schoof .................. B60G 11/113
                                                                  267/52
5,950,971 A *  9/1999 Koumbis ............... B60G 9/003
                                                                  248/200

(Continued)

OTHER PUBLICATIONS

Technical Bulletin; Operator's and Unit Maintenance for Semi-trailer, Transporter, Heavy Equipment 70 TON, M1000; Headquarters, Department of the Army; Aug. 2000; pp. 1-101.

*Primary Examiner* — James A English
(74) *Attorney, Agent, or Firm* — Brooks Kushman P.C.

(57) ABSTRACT

An axle assembly having a unitary trunnion bracket, an axle, and a support bracket. The unitary trunnion bracket may include an axle interface portion and a bracket interface portion. The bracket interface portion may extend from the axle interface portion. The axle may engage the axle interface portion. The support bracket may engage the bracket interface portion.

20 Claims, 6 Drawing Sheets

(56) References Cited

U.S. PATENT DOCUMENTS

| | | | | |
|---|---|---|---|---|
| 6,241,266 B1* | 6/2001 | Smith | ............... | B60B 35/04 |
| | | | | 280/124.116 |
| 6,805,369 B2* | 10/2004 | Galazin | ............... | B60G 9/02 |
| | | | | 280/124.116 |
| 2005/0218620 A1* | 10/2005 | Reineck | ............... | B60G 9/003 |
| | | | | 280/124.116 |
| 2010/0038877 A1* | 2/2010 | Cortez | ............... | B60G 11/113 |
| | | | | 280/124.175 |
| 2012/0080573 A1* | 4/2012 | Fulton | ............... | B23P 11/00 |
| | | | | 248/205.1 |
| 2013/0154224 A1* | 6/2013 | Wakefield | ............... | B60G 9/003 |
| | | | | 280/124.116 |
| 2014/0327220 A1* | 11/2014 | Holt | ............... | B60G 11/28 |
| | | | | 280/124.116 |
| 2015/0014512 A1* | 1/2015 | Pierce | ............... | F16D 65/0056 |
| | | | | 248/674 |

* cited by examiner

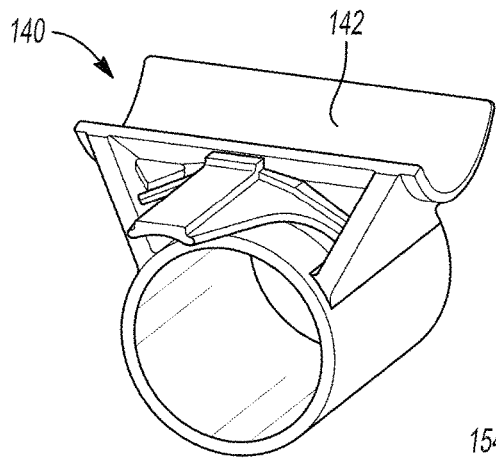
*Fig-10*
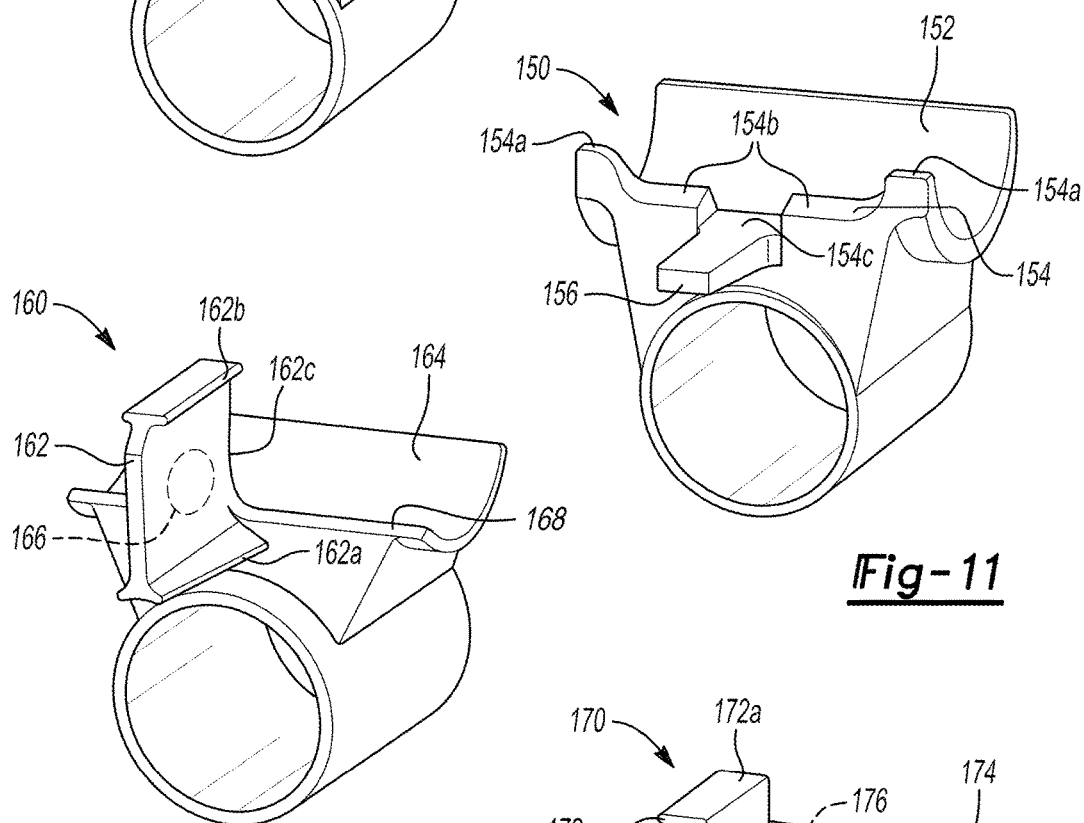
*Fig-11*
*Fig-12*
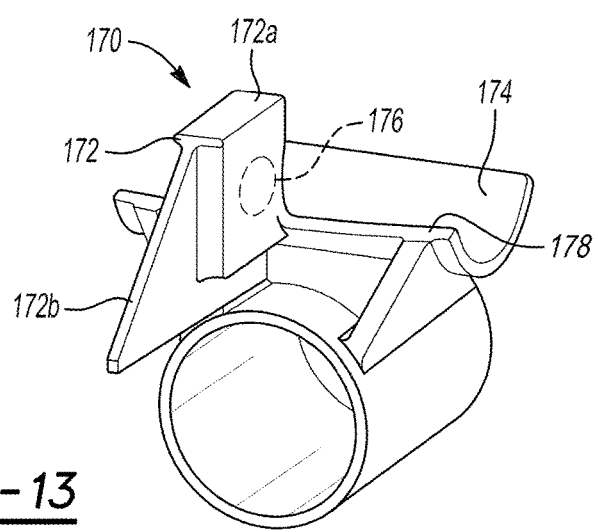
*Fig-13*

UNITARY TRUNNION BRACKET

TECHNICAL FIELD

This disclosure relates to an axle assembly and more particularly to a unitary trunnion bracket for an axle assembly.

BACKGROUND

An axle suspension system is disclosed U.S. Pat. No. 8,528,923.

SUMMARY

In at least one approach, an axle assembly is provided. The axle assembly may include a unitary trunnion bracket, an axle, and a support bracket. The unitary trunnion bracket may have an arm interface portion defining a bore disposed therein. The bore may have a first central axis extending therethrough. The unitary trunnion bracket may include an axle interface portion having a second central axis extending substantially orthogonal to the first central axis. The unitary trunnion bracket may include a bracket interface portion extending from the axle interface portion along a third central axis parallel to and offset from the first central axis. The axle may engage the axle interface portion. The support bracket may engage the bracket interface portion.

BRIEF DESCRIPTION OF THE DRAWINGS

FIGS. 7-13 are front perspective views of additional examples of unitary trunnion brackets.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
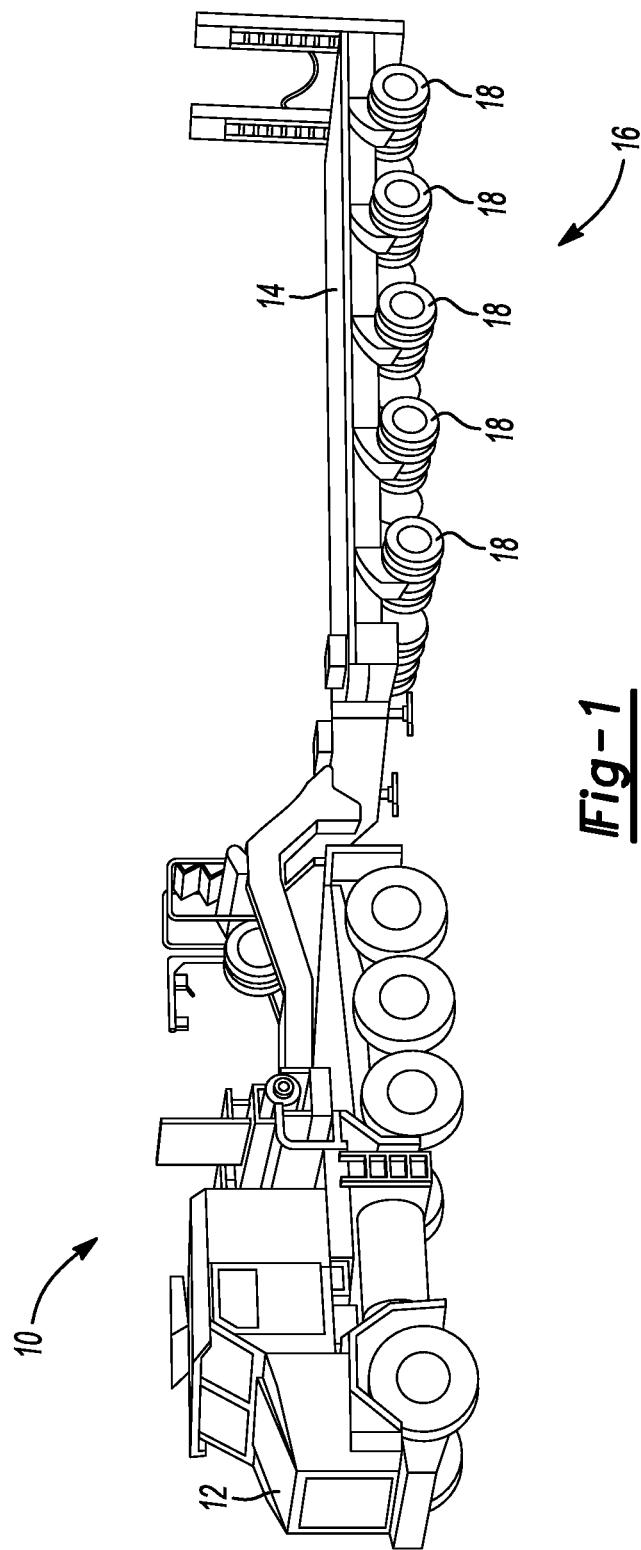
FIG. 1 is a perspective view of a vehicle.

Referring to FIG. 1, an example of a vehicle 10 is shown. The vehicle 10 may be a motor vehicle that may be used to transport cargo. For example, the vehicle 10 may be configured as a truck and may include a tractor 12 and/or a trailer 14. The tractor 12 may receive a driver and may propel and steer the vehicle 10. The trailer 14 may be coupled to the tractor 12 and may be configured to receive cargo. For example, the trailer 14 may be a flatbed trailer or an enclosed trailer. Other types of trailers are expressly contemplated.

The vehicle 10 may have an axle system 16. Although discussed herein with respect to the trailer 14, the axle system 16 may also or instead be provided on the tractor 12, or on any suitable vehicle.

The axle system 16 may include one or more axle suspension assemblies 18. The axle suspension assemblies 18 may each be full-width or half-width axle suspension assemblies. Each axle suspension assembly may support multiple wheels. In at least one example, the trailer 14 has forty wheels disposed across ten half-width axle suspension assemblies 18 that may extend halfway across the width of the trailer 14. For instance, a pair of half-width axle suspension assemblies 18 may be aligned with each other and disposed in a row, with multiple rows being arranged from the front to the back of the trailer 14.

Figure 2:
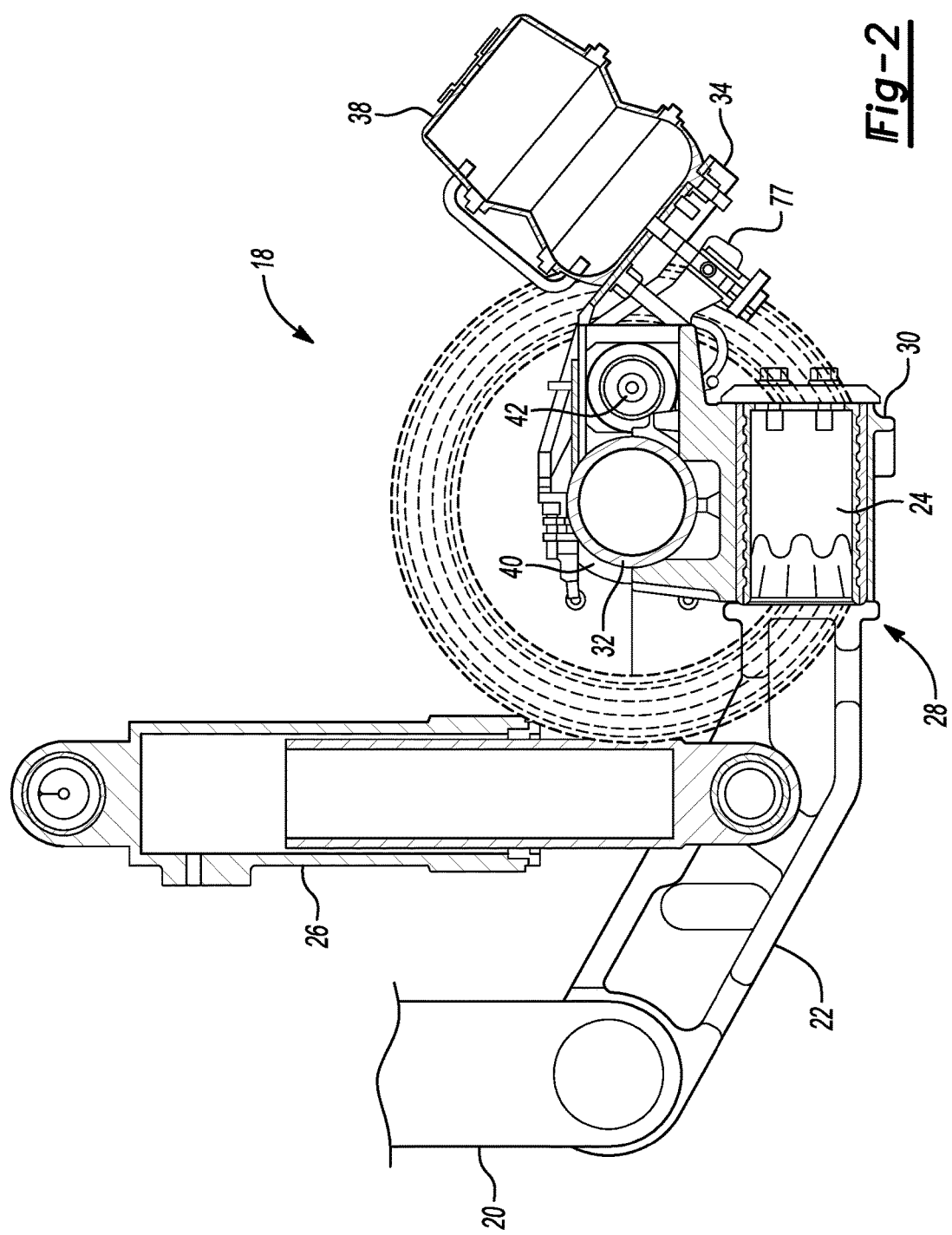
FIG. 2 is a side elevation view of an axle suspension assembly.

Referring to FIG. 2, an example of an axle suspension assembly 18 is shown in more detail. The axle suspension assembly 18 may include a hanger 20 that may be fixedly mounted to an underside of the trailer 14. A trailing arm 22 may be secured to the hanger 20. For example, a first end of the trailing arm 22 may be pivotally connected to the hanger 20. In at least one approach, a pivot pin may pivotally connect the trailing arm 22 to the hanger 20. As such, the trailing arm 22 may pivot about the pivot pin and pivot with respect to the hanger 20. A second end of the trailing arm 22 disposed opposite the first end may define or receive a bushing 24.

The axle suspension assembly 18 may further include a shock absorber 26 that may be pivotally secured at an underside of the trailer 14. The shock absorber 26 may be provided to dampen shock impulses and dissipate kinetic energy. A first end of the shock absorber 26 may be pivotally mounted to the underside of the trailer 14. The second end of the shock absorber 26 may be pivotally mounted to the trailing arm 22.

The axle suspension assembly 18 may further include an axle assembly 28. The axle assembly 28 may include a trunnion bracket 30, an axle 32, and a support bracket 34. As discussed in greater detail below, the trunnion bracket 30 may be an integrally-formed, unitary trunnion bracket. The trunnion bracket 30 may be disposed adjacent to the second end of the trailing arm 22 so as to be supported on the trailing arm 22. For example, the trunnion bracket 30 may be mounted to the bushing 24. The axle 32 and the support bracket 34 may be disposed on the trunnion bracket 30. For example, the axle 32 and the support bracket 34 may be mounted on and welded to the trunnion bracket 30.

The axle suspension assembly 18 may further include a brake assembly. The brake assembly may be a friction brake that may be configured to slow or inhibit rotation of at least one associated wheel. The brake assembly may include a brake actuator 38, one or more spiders 40 fixedly secured to the axle 32, a camshaft 42 rotatably supported in proximity to the axle 32 by the spiders 40, cams (e.g., S-cams) disposed on the camshaft 42, slack adjusters 44, and other brake assembly components (e.g., brake drums or brake discs, brake pad assemblies, etc.). The brake actuator 38 may be of any suitable type, such as a pneumatic, hydraulic, electrical, or electromechanical brake chamber. In at least one approach, the brake actuator 38 may be a dual brake chamber having a service brake chamber and a parking brake chamber. A pneumatic or hydraulic brake actuator 38 may be actuated by a pressurized fluid and may actuate the brake assembly, for example, by effecting rotation of the camshaft 42.

Figure 3:
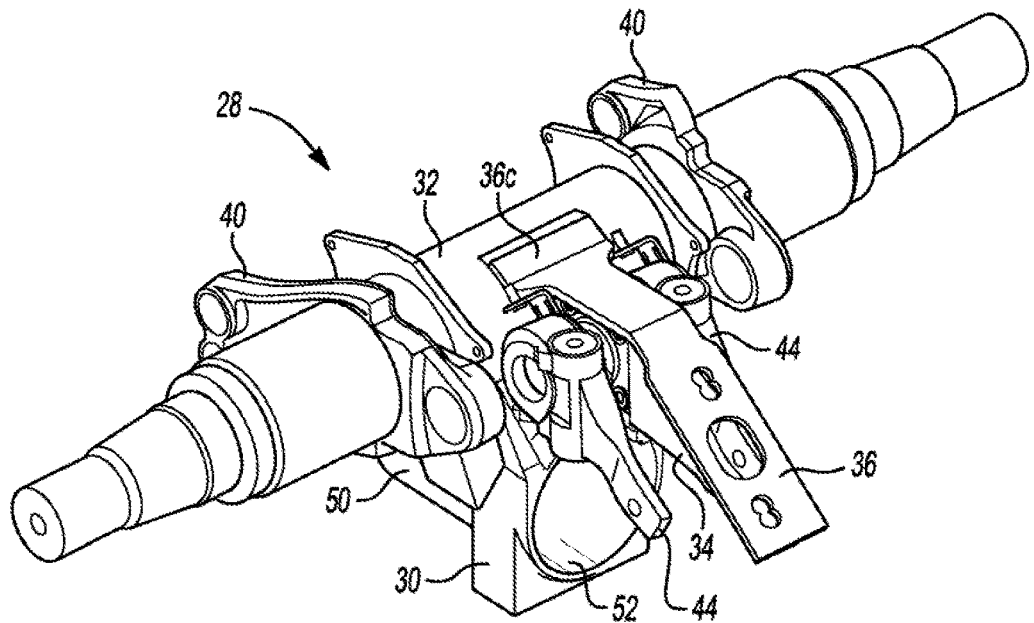
FIG. 3 is a perspective view of a portion of the axle suspension assembly.
Figure 4:
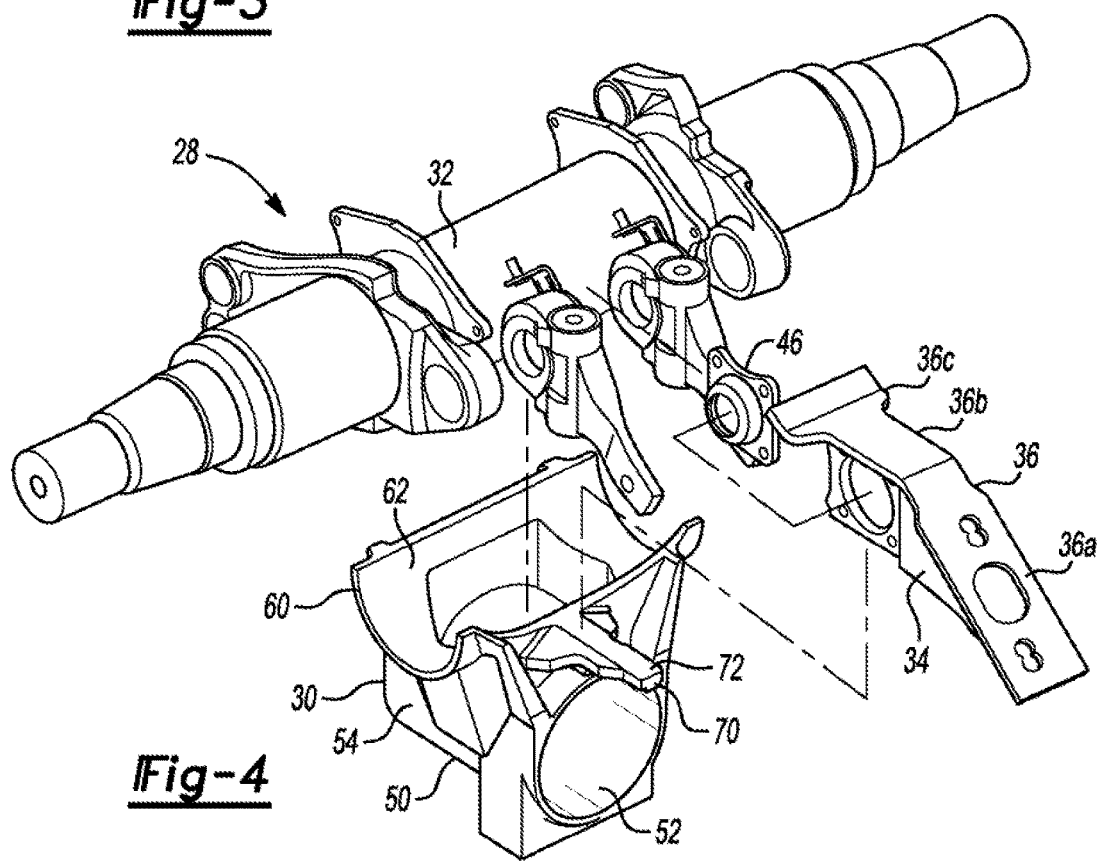
FIG. 4 is an exploded perspective view of the portion of the axle suspension assembly of FIG. 3.

Referring to FIGS. 3 and 4, the support bracket 34 may be adapted to support one or more components of a brake assembly. For example, the brake actuator 38 may be mounted on the support bracket 34.

The support bracket 34 may include an integrally-formed, unitary support plate 36 that may be a single component. The unitary support plate may have a mounting portion 36a, an intermediate portion 36b, and an attachment portion 36c.

The mounting portion 36a may extend in a first plane. The brake actuator 38 may be mounted to the mounting portion 36a.

The intermediate portion 36b may extend from the mounting portion 36a to the attachment portion 36c. The intermediate portion 36b may be disposed in a second plane that may be arranged at non-zero angle with respect to the first plane in one or more configurations. For example, the intermediate portion 36b may extend at an angle of about 45° with respect to the mounting portion 36a.

The attachment portion 36c may extend from the intermediate portion 36b. In at least one approach, at least a first portion of the attachment portion 36c may extend in the second plane from the intermediate portion 36b and a second portion of the attachment portion 36c may extend in a third plane at a non-zero angle with respect to the second plane. For example, the second portion may extend at an angle of around 30-45° with respect to the first portion. In at least one approach, the first plane and the third plane may be substantially parallel.

The second portion of the attachment portion 36c may interface with the axle 32. For example, the second portion may engage the axle 32 and may be fixedly coupled to the axle 32 in any suitable manner, such as by welding. In at least one approach, the intermediate portion 36b may have a first width and the attachment portion 36c may have second width that may be greater than the first width. The increased width of the attachment portion 36c may provide a greater area to secure the support bracket 34 to the axle 32.

Figures 5, 6:
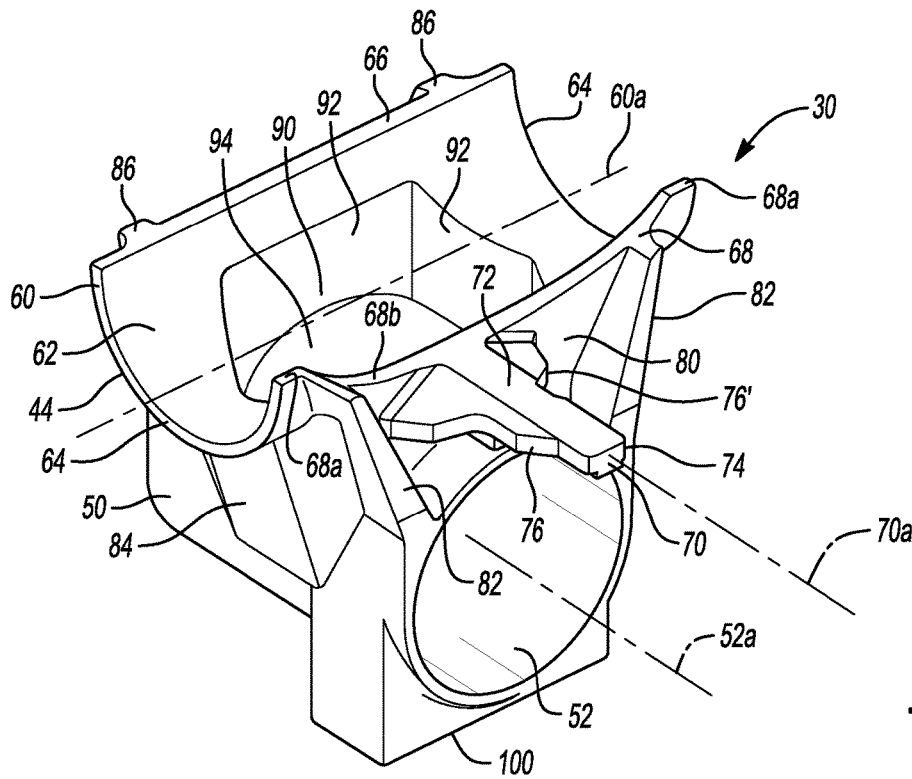
FIG. 5 is a front perspective view of a unitary trunnion bracket.
FIG. 6 is a rear perspective view of a unitary trunnion bracket.

The trunnion bracket 30 may couple the axle 32 to the trailing arm 22. The trunnion bracket 30 may include an arm interface portion 50. The arm interface portion 50 may be in the form of a hollow cylinder. In this way, the arm interface portion 50 may define a bore 52 extending within the hollow cylinder. In at least one approach, the bore 52 extends through an entire length of the arm interface portion 50. In at least another approach, the bore 52 extends through less than an entire length of the arm interface portion 50. The bore 52 may be a cylindrical bore, and may define an inner diameter sized to interface with the trailing arm 22. For example, the bore 52 may be sized to receive the bushing 24 of the trailing arm 22. As shown in FIG. 5, the bore may be disposed about a first central axis 52a.

The arm interface portion 50 may also have a curved exterior surface 54. The curved exterior surface 54 may be disposed opposite the bore 52.

The trunnion bracket 30 may further include an axle interface portion 60. The axle interface portion 60 may generally form a portion of a cylindrical shell, such as a half-cylindrical shell. The axle interface portion 60 may define a support surface 62. The support surface 62 may have a geometry corresponding to the exterior geometry of the axle 32. For example, the support surface 62 may define a generally rounded support surface having a radius of curvature generally corresponding to a radius of the axle 32. In this way, the axle interface portion 60 may function as an axle wrap. The trunnion bracket 30 may engage and support the axle 32 along the support surface 62.

The trunnion bracket 30 may further include a bracket interface portion 70. The bracket interface portion 70 may define a bracket support surface 72. The bracket support surface 72 may be generally flat and may be sized to engage and support a portion of the support bracket 34.

Referring to FIGS. 5 and 6, the trunnion bracket 30 may define one or more walls 80 that may be integrally formed with and may extend from the axle interface portion 60 to the arm interface portion 50. The trunnion bracket 30 may also define at least one rib extending along an outside surface of a wall 80 from the arm interface portion 50 to or toward the axle interface portion 60. For example, the trunnion bracket 30 may include one or more forward ribs 82, one or more side ribs 84, one or more rear ribs 86, or combinations thereof.

Referring to FIG. 5, one or more forward ribs 82 may extend between the arm interface portion 50 and a forward side surface of the axle interface portion 60. As shown in FIG. 5, the bracket interface portion 70 may be disposed between the forward ribs 82.

Referring to FIGS. 5 and 6, one or more side ribs 84 may extend from the arm interface portion 50 to a bottom exterior surface of the axle interface portion 60 that may be disposed opposite the support surface 62.

Referring to FIG. 6, one or more rear ribs 86 may extend from the arm interface portion 50 to a rear side surface of the axle interface portion 60.

Referring to FIG. 5, the axle interface portion 60 may define outer edges disposed about a perimeter of the support surface 62. For example, the support surface 62 may define opposing radial edges 64 having a radius of curvature generally corresponding to a radius of the axle 32. The support surface 62 may also define opposing longitudinal edges 66, 68 generally extending in a direction parallel to a second central axis 60a of the axle interface portion 60 and along a longitudinal length of the axle interface portion 60. The second central axis 60a may be disposed above the first central axis 52a and may extend substantially orthogonal to the first central axis 52a In at least one approach, the support surface 62 may define a longitudinal edge 68 having a varying height. The longitudinal edge 68 may have opposing end regions 68a and a reduced height region 68b extending between the opposing end regions 68a. For example, one or both opposing end regions 68a may extend to a height corresponding to the height of longitudinal edge 66. In this way, the axle interface portion 60 may define an arc of approximately 180°. For example, the axle support surface 62 may extend along an arc of approximately 180° at at least one end region 68a. It is also contemplated, that the axle support surface 62 may extend along an arc of less than 180° in one or more embodiments.

The axle interface portion 60 may receive the axle 32. When received in the receptacle, the axle 32 may be secured to the trunnion bracket 30. For example, the axle 32 may be welded to the axle interface portion 60. Welding may be performed along one or more of the longitudinal edges 66, 68 and the opposing radial edges 64. In at least one approach, longitudinal edge 66 is secured to the axle 32 at a height of the axle 32 corresponding to the neutral axis of the axle 32. The opposing end regions 68a of the longitudinal edge 68 may also be secured to the axle 32 at a height of the axle 32 corresponding to the neutral axis of the axle 32. As described, the axle interface portion 60 may define an arc of approximately 180°. In this way, the axle 32 may be welded to the axle interface portion 60 at opposite longitudinal sides of the axle 32 at heights corresponding to the neutral axis of the axle 32. Welds at locations corresponding to the neutral axis of the axle 32 may experience reduced stresses when the axle 32 is subjected to bending in a vertical plane.

Referring to FIG. 5, the trunnion bracket 30 may define a cavity 90 that may extend through the axle interface portion 60. For example, interior cavity walls 92 may extend from support surface 62 through the axle interface portion 60, and to the arm interface portion 50. The interior cavity walls 92 may engage a top outer surface of the arm interface portion 50 to define a cavity 90 having a continuous bottom wall 94 that may be separated from the bore 52. The cavity 90 may be empty to reduce manufacturing costs and weight. In at least another approach, discussed in greater detail below, one or more ribs may extend within the cavity 90. In at least another approach, the cavity 90 may extend through the arm interface portion 50. For example, the trunnion bracket 30 may be formed without the continuous bottom wall 94 such that the interior of the arm interface portion 50 is exposed through the cavity 90 when the trunnion bracket 30 is viewed from a top view.

The bracket interface portion 70 may extend from an exterior surface of a wall 80 of the trunnion bracket 30. The bracket interface portion 70 may extend beyond an end of the arm interface portion 50. For example, the bracket interface portion 70 may define a body 74 (e.g., a generally rectangular body or body having a substantially rectangular cross section) that may extend along a third central axis 70a. The body 74 may be sized to support a support bracket 34 on the bracket support surface 72. As shown in FIG. 5, the third central axis 70a of the bracket interface portion 70 may extend substantially parallel to the first central axis 52a of the bore 52 and may be disposed substantially orthogonal to the second central axis 60a of the axle interface portion 60.

In at least one approach, the bracket interface portion 70 may extend from the trunnion bracket 30 at the reduced height region 68b of the longitudinal edge 68. The bracket interface portion 70 may be disposed such that the bracket support surface 72 is aligned with or flush with a surface of the reduced height region 68b of the longitudinal edge 68. In this way, the third central axis 70a of the bracket interface portion 70 may be disposed above the first central axis 52a of the bore 52 of the arm interface portion 50 and below the second central axis 60a of the axle interface portion 60.

One or more support wings 76, 76' may extend from the bracket interface portion 70. The support wings 76, 76' may, for example, extend between the body 74 of the bracket interface portion 70 and a wall 80 of the axle interface portion 60. The support wings 76, 76' may be disposed on opposite sides of the body 74 and may be mirror images of each other. In addition, the support wings 76, 76' may extend at a downward angle from the body 74 and away from a longitudinal edge 68 and toward the forward ribs 82.

As shown in FIG. 5, the bracket interface portion 70 may be an asymmetrical bracket interface portion 70. For example, the asymmetrical bracket interface portion 70 may include a first support wing 76 defining a first shape, and a second support wing 76' disposed opposite the body 74 from the first support wing 76 and defining a second shape different than the that of the first support wing. The asymmetrical support wings may provide different weld locations on either side of the body 74 of the bracket interface portion 70.

Referring to FIG. 4, the support bracket 34 may be secured to the trunnion bracket 30 at the bracket interface portion 70. For example, the support bracket 34 may be welded to the bracket interface portion 70 at the body 74 and/or at one or both of the support wings 76, 76'.

In at least one approach, the arm interface portion 50, the axle interface portion 60, and the bracket interface portion 70 may be cast or formed as a one-piece component without welding. In this way, the trunnion bracket 30 may be a unitary, integrally formed trunnion bracket 30. The unitary trunnion bracket may be substantially free of internal welds between the axle interface portion 60 and the arm interface portion 50, and between the bracket interface portion 70 and the arm interface portion 50. A reduction in the number of welds may reduce associated manufacturing time and/or costs. A reduction in the number of welds may also improve durability and reliability of the trunnion bracket as compared to a multi-piece design.

Referring to FIGS. 5 and 6, the trunnion bracket 30 may further include an axle lift interface portion 100. The axle lift interface portion 100 may extend from the arm interface portion 50 (e.g., from the curved exterior surface) in a direction opposite the axle interface portion 60. The axle lift interface portion 100 may include one or more walls extending from the arm interface portion 50. For example, the axle lift interface portion 100 may include two parallel and opposing sidewalls 102 and a forward engagement wall 104 extending between the sidewalls 102. In at least one approach, the forward engagement wall 104 has a length that may correspond to or be substantially the same as an outer diameter of the hollow cylinder of the arm interface portion 50.

In at least one approach, the axle lift interface portion 100 may be integrally formed with the axle interface portion 60 and the bracket interface portion 70.

The axle lift interface portion 100 may be formed to interface with an axle lift system of the vehicle 10 that may secure the axle assembly 28 in a position where the tires of the axle assembly 28 are elevated above a road or support surface. The axle lift system may include, for example, an axle securing unit having a hook and an actuator. The axle lift interface portion 100 may be engaged by the hook to secure the axle assembly 28.

FIGS. 7-13 depict additional examples of a unitary trunnion bracket.

Figure 7:
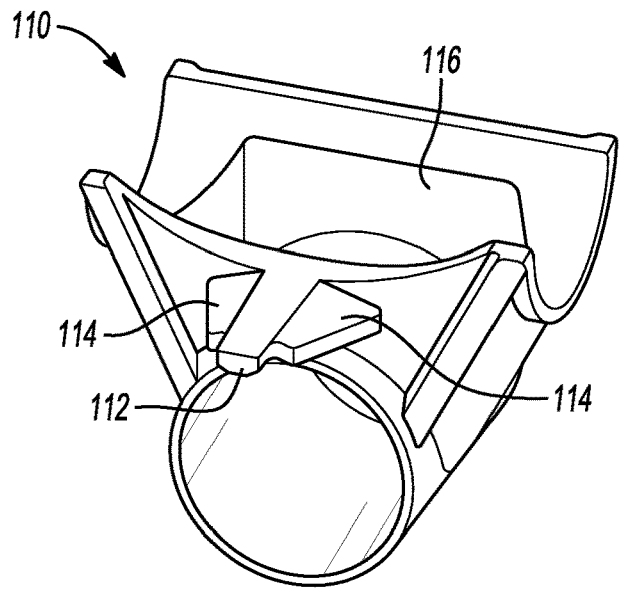

Referring to FIG. 7, a trunnion bracket 110 is shown that does not have an axle lift interface portion. The trunnion bracket 110 may include a bracket interface portion 112 having symmetrical support wings 114. The support wings 114 may extend along a longer length of the bracket interface portion 112 as compared to the support wings 76, 76' shown in FIGS. 4 and 5. The support wings 114 may also have longitudinal side edges that extend at an angle relative to a central axis of the bracket interface portion 112. The trunnion bracket 110 may also define a larger cavity 116 as compared to the cavity 90 shown in FIGS. 4 and 5. More particularly, the trunnion bracket 110 may define a cavity 116 disposed through a larger area of the support surface and having a greater volume as compared to the cavity 90 shown in FIGS. 4 and 5.

Figure 8:
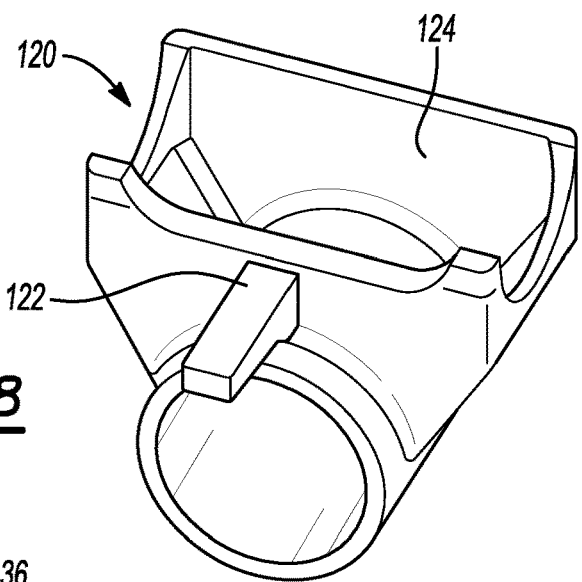

Referring to FIG. 8, a trunnion bracket 120 is shown that has a bracket interface portion 122 having no support wings. The trunnion bracket 120 may also define a larger cavity 124 as compared to the cavity 116 of FIG. 7. More particularly, the trunnion bracket 120 may define a cavity 124 that may extend between opposing ends of the arm interface portion and may have a greater volume as compared to the cavity 116 shown in FIG. 7.

Figure 9:
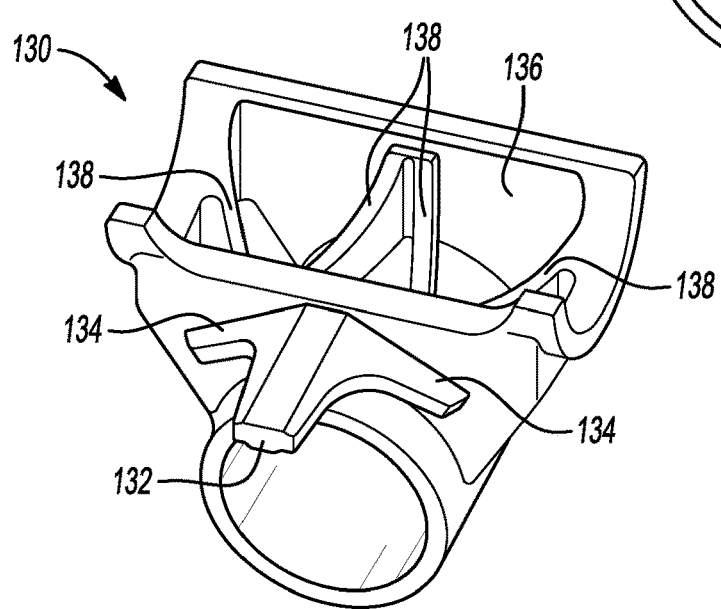

Referring to FIG. 9, a trunnion bracket 130 is shown that has a bracket interface portion 132 having symmetrical support wings 134. Each support wing 134 may extend away from the body at a substantially right angle. The trunnion bracket 130 may also define a larger cavity 136 as compared to the cavity 116 of FIG. 7. More particularly, the trunnion bracket 130 may define a cavity 136 having a greater volume as compared to the cavity 116 shown in FIG. 7. The trunnion bracket 130 may also define at least one rib 138 extending within the cavity 136. In at least one approach, the rib 138 may extend within the cavity 136 between the arm interface portion and an interior cavity wall of the axle interface portion of the trunnion bracket 130.

Referring to FIG. 10, a trunnion bracket 140 may be provided with an axle interface portion 142 having no cavity disposed therein.

Referring to FIG. 11, a trunnion bracket 150 may be provided with an axle interface portion 152 that does not have a cavity, but has edges similar to FIGS. 4 and 5. The axle interface portion 152 may have a longitudinal edge 154 with end regions 154a, two first reduced height regions 154b disposed between the end regions 154a, and a second reduced height region 154c disposed between the first reduced height regions 154b. The bracket interface portion 156 may have a top surface that may be flush with the second reduced height region 154c.

Referring to FIG. 12, a trunnion bracket 160 is shown that has a bracket interface portion 162 having a height that extends above a top surface 168 of the axle interface portion 164. The bracket interface portion 162 may have an I-beam configuration that may include a first flange 162a interfacing the axle interface portion 164, a second flange 162b disposed above the top surface 168 of the axle interface portion 164, and a web 162c extending between the first flange 162a and the second flange 162b. The second flange 162b may be provided to support a portion of a support bracket (e.g., the intermediate portion 36b of the unitary support plate 36 shown in FIGS. 3 and 4). In at least one approach, an aperture 166 may extend through the web 162c. The aperture 166 may be sized to receive a portion of a brake assembly, such as the camshaft 42 shown in FIG. 2 or the cam shaft support bushing 46 shown in FIG. 4.

Referring to FIG. 13, a trunnion bracket 170 may be provided with a bracket interface portion 172 having a height that extends above a top surface 178 of the axle interface portion 174. The bracket interface portion 172 may have a first body portion 172a interfacing the axle interface portion 174 and extending above the axle interface portion 174, and a second body portion 172b interfacing both the first body portion 172a and the axle interface portion 174, and extending in a direction away from the axle interface portion 174. In at least one approach, the first body portion 172a generally forms a quadrilateral, and the second body portion 172b may generally form a triangle. The first body portion 172a may be provided with a first thickness, and the second body portion 172b may be provided with a second thickness different than (e.g., less than or greater than) that of the first body portion 172a. The first body portion 172a may be provided to support a portion of a support bracket (e.g., an intermediate portion 36b of the unitary support plate 36 shown in FIGS. 3 and 4). The second body portion 172b may be support to receive another portion of a support bracket (e.g., a mounting portion 36a of the unitary support plate 36 shown in FIGS. 3 and 4). In at least one approach, an aperture 176 may be disposed through the first body portion 172a. The aperture 176 may be sized to receive a portion of a brake assembly, such as the camshaft 42 shown in FIG. 2 or the cam shaft support bushing 46 shown in FIG. 4.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a unitary trunnion bracket including:
      an arm interface portion defining a bore, the bore having a first central axis extending therethrough,
      an axle interface portion having a second central axis extending substantially orthogonal to the first central axis, and
      a bracket interface portion extending from the axle interface portion along a third central axis disposed parallel to and offset from the first central axis;
   an axle that engages the axle interface portion; and
   a support bracket that engages the bracket interface portion, wherein the support bracket includes a unitary support plate having a mounting portion disposed on the bracket interface portion, an intermediate portion extending from the mounting portion, and an attachment portion extending from the intermediate portion that is disposed on the axle.

2. The axle assembly of claim 1 wherein the unitary trunnion bracket is substantially free of welds between the arm interface portion and the axle interface portion, and is substantially free of welds between the axle interface portion and the bracket interface portion.

3. The axle assembly of claim 1 wherein the bracket interface portion defines a generally rectangular body extending along the third central axis, the generally rectangular body defining a bracket support surface that supports the support bracket.

4. The axle assembly of claim 3 wherein the bracket interface portion has first and second support wings that extend from opposite sides of the generally rectangular body and from a side wall of the axle interface portion, wherein the first and second support wings extend at a downward angle from the generally rectangular body.

5. The axle assembly of claim 1 wherein the bracket interface portion extends above a top surface of the axle interface portion.

6. The axle assembly of claim 1 wherein the axle interface portion defines a longitudinal edge extending along a longitudinal length of the axle interface portion, the longitudinal edge having opposing end regions and a reduced height region extending between the opposing end regions, wherein the bracket interface portion extends from the reduced height region.

7. The axle assembly of claim 6 wherein the axle interface portion extends along an arc of approximately 180°.

8. The axle assembly of claim 1 wherein the unitary trunnion bracket further comprises a side rib that extends along an exterior wall of the unitary trunnion bracket from the arm interface portion to the axle interface portion.

9. The axle assembly of claim 1 wherein the unitary trunnion bracket further comprises a pair of rear ribs that extends along an exterior wall of the unitary trunnion bracket from the arm interface portion to the axle interface portion and are disposed on opposite sides of the bracket interface portion.

10. The axle assembly of claim 9 further comprising at least one rib that is disposed in a cavity of the axle interface portion and that extends from a bottom surface of the cavity.

11. The axle assembly of claim 1 wherein the arm interface portion defines a hollow cylinder, and wherein an exterior surface of the hollow cylinder defines a curved exterior surface.

12. The axle assembly of claim 1 wherein the mounting portion is disposed in a first plane, the intermediate portion is disposed in a second plane that is disposed at a non-zero angle with respect to the first plane, and the attachment portion is at least partially disposed in a third plane that is disposed at a non-zero angle with the second plane.

13. The axle assembly of claim 12 wherein the attachment portion has a first region extending in the second plane and a second region extending in the third plane.

14. The axle assembly of claim 1 wherein the attachment portion is wider than the intermediate portion.

15. An axle assembly comprising:
a unitary trunnion bracket including:
an arm interface portion defining a bore, the bore having a first central axis extending therethrough,
an axle interface portion having a second central axis extending substantially orthogonal to the first central axis, and
a bracket interface portion extending from the axle interface portion along a third central axis disposed parallel to and offset from the first central axis:
an axle that engages the axle interface portion; and
a support bracket that engages the bracket interface portion, wherein the bracket interface portion defines a generally rectangular body extending along the third central axis, the generally rectangular body defining a bracket support surface that supports the support bracket, and the bracket interface portion defines at least one support wing extending between the generally rectangular body and a side wall of the axle interface portion.

16. The axle assembly of claim 14, wherein the support bracket includes a unitary support plate having a mounting portion disposed on the bracket interface portion, an intermediate portion extending from the mounting portion, and an attachment portion extending from the intermediate portion that is disposed on the axle.

17. An axle assembly comprising:
a unitary trunnion bracket including:
an arm interface portion defining a bore, the bore having a first central axis extending therethrough,
an axle interface portion having a second central axis extending substantially orthogonal to the first central axis, and
a bracket interface portion extending from the axle interface portion along a third central axis disposed parallel to and offset from the first central axis;
an axle that engages the axle interface portion; and
a support bracket that engages the bracket interface portion, wherein the axle interface portion includes interior cavity walls extending from a support surface of the axle interface portion that engages the axle to the arm interface portion to define a cavity having a continuous bottom wall.

18. The axle assembly of claim 17 wherein the unitary trunnion bracket further comprises at least one rib extending within the cavity between the arm interface portion and an interior cavity wall of the axle interface portion.

19. An axle assembly comprising:
a unitary trunnion bracket including:
an arm interface portion defining a bore having a first central axis extending therethrough and a hollow cylinder, wherein an exterior surface of the hollow cylinder defines a curved exterior surface,
an axle interface portion having a second central axis extending substantially orthogonal to the first central axis, and
a bracket interface portion extending from the interface portion along a third central axis disposed parallel to and offset from the first central axis;
an axle that engages the axle interface portion;
a support bracket that engages the bracket interface portion; and
an axle lift interface portion extending from the curved exterior surface, the axle lift interface portion having a forward engagement wall disposed substantially perpendicular to the first central axis.

20. The axle assembly of claim 19 wherein the axle lift interface portion further comprises opposing side al Is extending from opposite ends of the axle lift interface portion and from the curved exterior surface.

* * * * *